(12) United States Patent
Liao

(10) Patent No.: US 11,719,303 B2
(45) Date of Patent: Aug. 8, 2023

(54) CYLINDER WITH SWITCHABLE SYSTEM AND SHOCK ABSORBER HAVING THE SAME

(71) Applicant: Chih-Hsien Liao, Taichung (TW)

(72) Inventor: Chih-Hsien Liao, Taichung (TW)

( * ) Notice: Subject to any disclaimer, the term of this patent is extended or adjusted under 35 U.S.C. 154(b) by 22 days.

(21) Appl. No.: 17/533,979

(22) Filed: Nov. 23, 2021

(65) Prior Publication Data

US 2023/0160449 A1    May 25, 2023

(51) Int. Cl.
*F16F 9/06* (2006.01)
*F16F 9/32* (2006.01)
*F16F 9/49* (2006.01)
*F16F 9/56* (2006.01)
*B60G 15/06* (2006.01)

(52) U.S. Cl.
CPC ............ *F16F 9/063* (2013.01); *F16F 9/3235* (2013.01); *F16F 9/49* (2013.01); *F16F 9/56* (2013.01); *B60G 15/06* (2013.01)

(58) Field of Classification Search
USPC .............................................. 188/267, 322.2
See application file for complete search history.

(56) References Cited

U.S. PATENT DOCUMENTS

| | | | |
|---|---|---|---|
| 2,940,749 A * | 6/1960 | Kemelhor | F16F 6/00 74/29 |
| 5,360,230 A | 11/1994 | Yamada et al. | |
| 2006/0016649 A1 * | 1/2006 | Gordaninejad | F16F 9/537 188/267 |

FOREIGN PATENT DOCUMENTS

| | | | |
|---|---|---|---|
| CN | 106286685 A | | 1/2017 |
| CN | 113153956 A | * | 7/2021 |

OTHER PUBLICATIONS

Search Report appended to an Office Action, which was issued to Taiwanese counterpart application No. 110131092 by the TIPO dated Apr. 27, 2022 with an English translation thereof.
Search Report issued to European counterpart application No. 21212370.7 by the EPO dated May 31, 2022.

* cited by examiner

*Primary Examiner* — Melanie Torres Williams
(74) *Attorney, Agent, or Firm* — Schwegman Landberg & Woessner, P.A.

(57) ABSTRACT

A shock absorber includes a cylinder that includes a cylinder body defining a disposing space, a piston movably disposed in the disposing space and dividing the disposing space into a liquid space and an air space, and an electronic control device disposed in the air space and dividing the air space into a first chamber space and a second chamber space. The electronic control device has an electromagnetic unit and a rod unit that includes a blocking member, and that is controllable by the electromagnetic unit to convert between a blocking state and an unblocking state, in which the blocking member respectively prevents and permits fluid communication between the first chamber space and the second chamber space.

11 Claims, 12 Drawing Sheets

CYLINDER WITH SWITCHABLE SYSTEM AND SHOCK ABSORBER HAVING THE SAME

FIELD

The disclosure relates to a shock absorber for a vehicle, and more particularly to a cylinder with a switchable system and a shock absorber having the same.

BACKGROUND

A conventional magnetorheological shock absorber is filled with magnetorheological fluid whose viscosity can be changed by a magnetic field that is created by an electric current controlled by the conventional magnetorheological shock absorber. As the viscosity the magnetorheological fluid changes, damping characteristics of the magnetorheological fluid change accordingly. When a vehicle (e.g., a car) is equipped with the conventional magnetorheological shock absorber, a driver may operate a button at the driver's seat to adjust damping characteristics of the conventional magnetorheological shock absorber (i.e., to make the conventional magnetorheological shock absorber stiffer or softer). Therefore, vehicles with the conventional magnetorheological shock absorber may offer good maneuverability and a comfortable ride to drivers and are popular with consumers.

However, because manufacturing costs of the conventional magnetorheological shock absorber are relatively high, in most situations, only vehicles with high selling prices (e.g., race cars and luxury cars) are equipped with the conventional magnetorheological shock absorber, which the average consumer may not be able to afford. In addition, the magnetorheological fluid includes small metal particles that may abrade components of the conventional magnetorheological shock absorber, which may result in leakage of the magnetorheological fluid. Consequently, consumers may have to frequently replace, or repair, the conventional magnetorheological shock absorber that is leaking, and maintenance expenses may be relatively high. Though some consumers may replace the conventional magnetorheological shock absorber with a conventional mechanical shock absorber to avoid high maintenance expenses, the stiffness of the conventional mechanical shock absorber then becomes non-adjustable during driving, and the drive mode button at the driver's seat will become superfluous.

SUMMARY

Therefore, an object of the disclosure is to provide a cylinder that can alleviate at least one of the drawbacks of the prior art.

According to the disclosure, the cylinder is adapted for a shock absorber, and includes a cylinder body, a piston, a cover and an electronic control device. The cylinder body has an inner surface that defines a disposing space. The piston is movably disposed in the disposing space, and divides the disposing space into a liquid space that is adapted for a damping liquid to flow therein, and an air space that is adapted for a gas to be filled in. The cover is mounted to the cylinder body such that the air space of the cylinder body, is enclosed. The electronic control device is disposed in the air space of the cylinder body, divides the air space into a first chamber space and a second chamber space, and has a chamber communicating opening, an electromagnetic unit, and a rod unit. The first chamber space and the second chamber space fluidly communicate with each other through the chamber communicating opening. The electromagnetic unit generates a magnetic field when energized. The rod unit includes a blocking member, and is controllable by the electromagnetic unit to convert between a blocking state, in which the blocking member blocks the chamber communicating opening to prevent fluid communication between the first chamber space and the second chamber space, and an unblocking state, in which the blocking member unblocks the chamber communicating opening to permit fluid communication between the first chamber space and the second chamber space.

Another object of the disclosure is to provide a shock absorber that can alleviate at least one of the drawbacks of the prior art.

According to the disclosure, the shock absorber includes a shock absorber body and the cylinder as mentioned above. The shock absorber body is adapted for a damping liquid to flow therein, and includes an adjusting knob that is adapted to change a level of a damping force. The cylinder is connected to the shock absorber body and is adapted for the damping liquid to flow therein. The piston of the cylinder is adapted to be movable by the damping liquid to compress the gas that is filled in the air space of the cylinder so that the cylinder absorbs shock.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
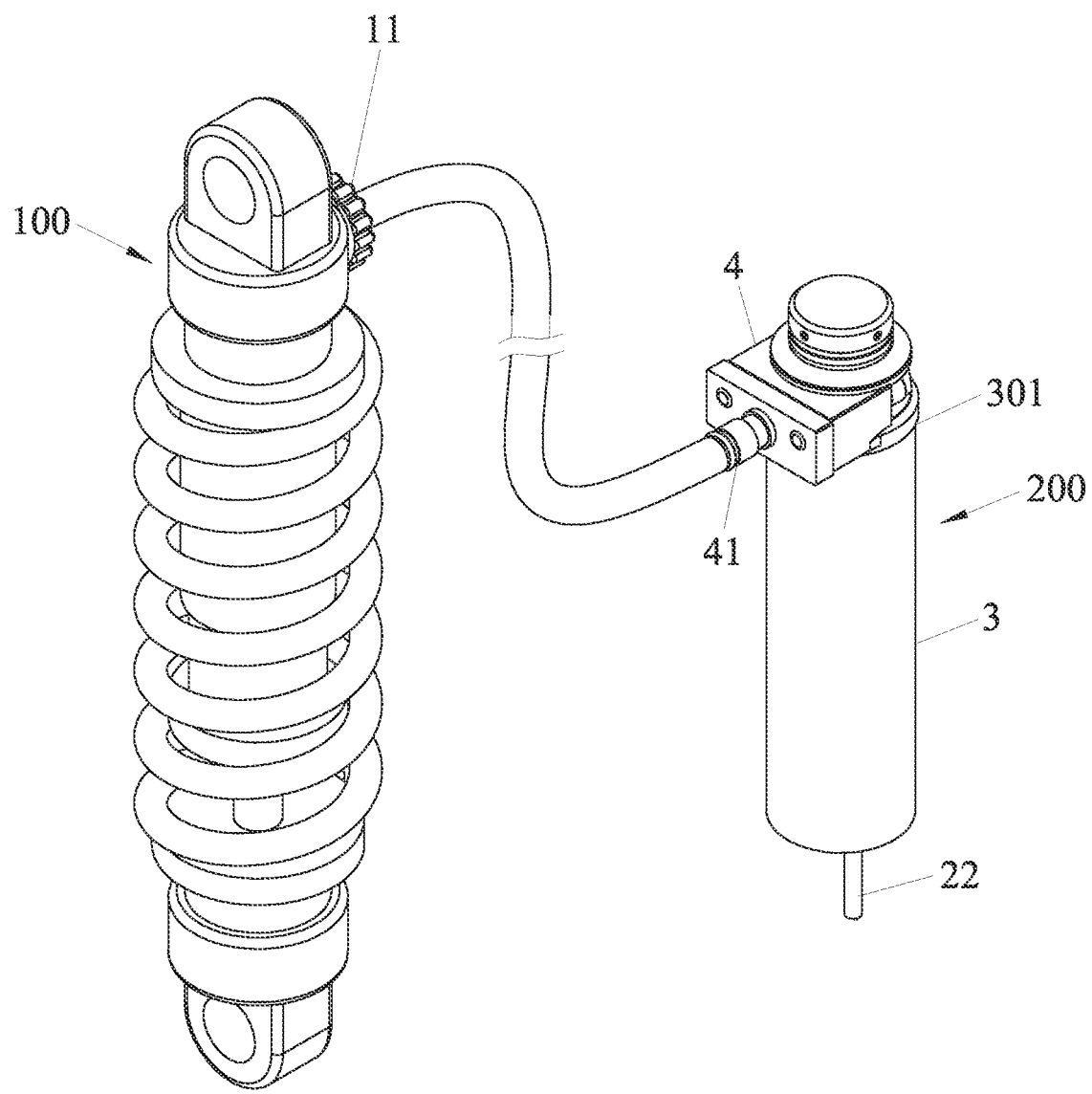
FIG. 1 is a fragmentary perspective view of a first embodiment of a shock absorber according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
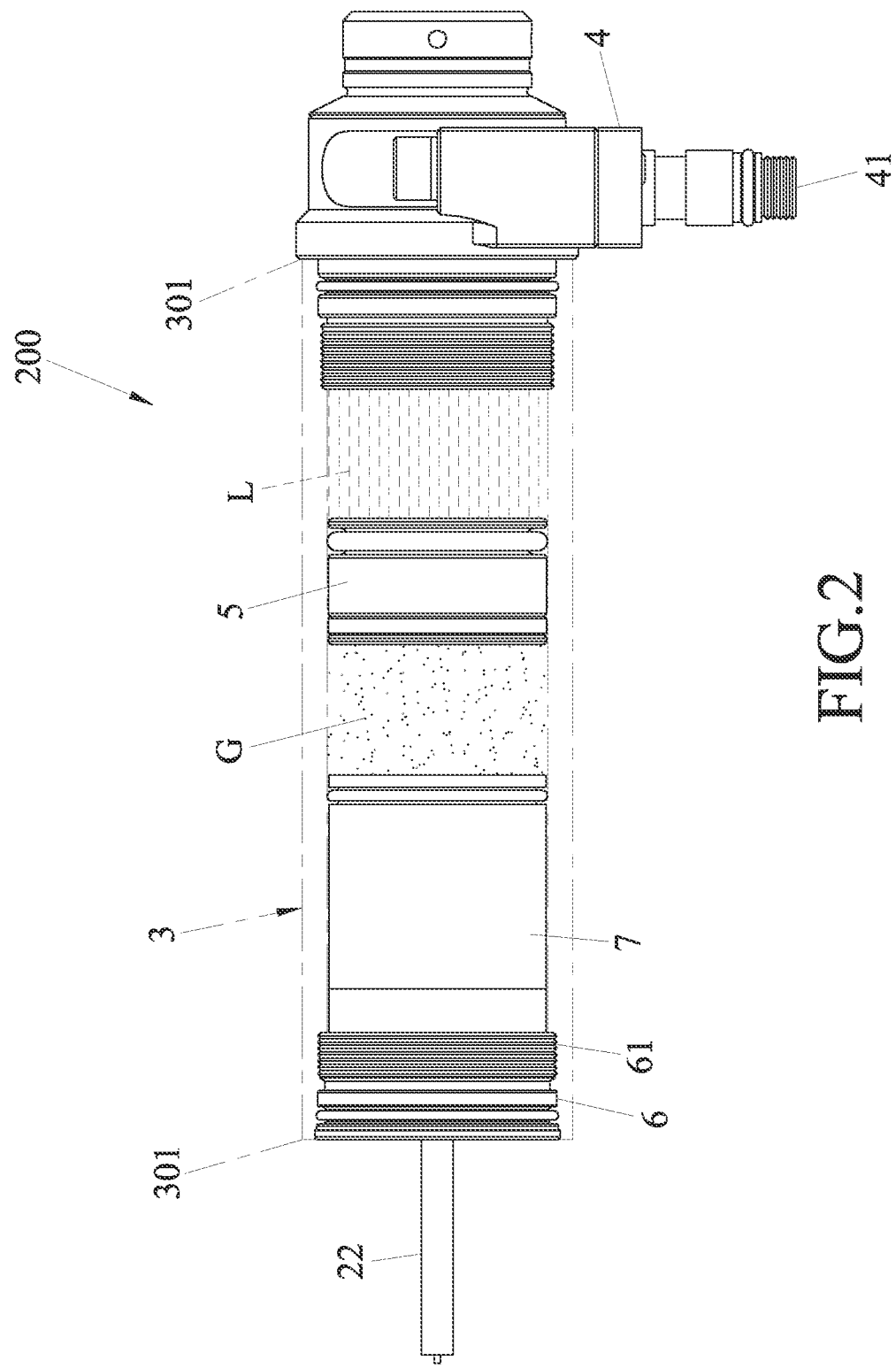
FIG. 2 is a side view illustrating a cylinder of the first embodiment.
Figure 3:
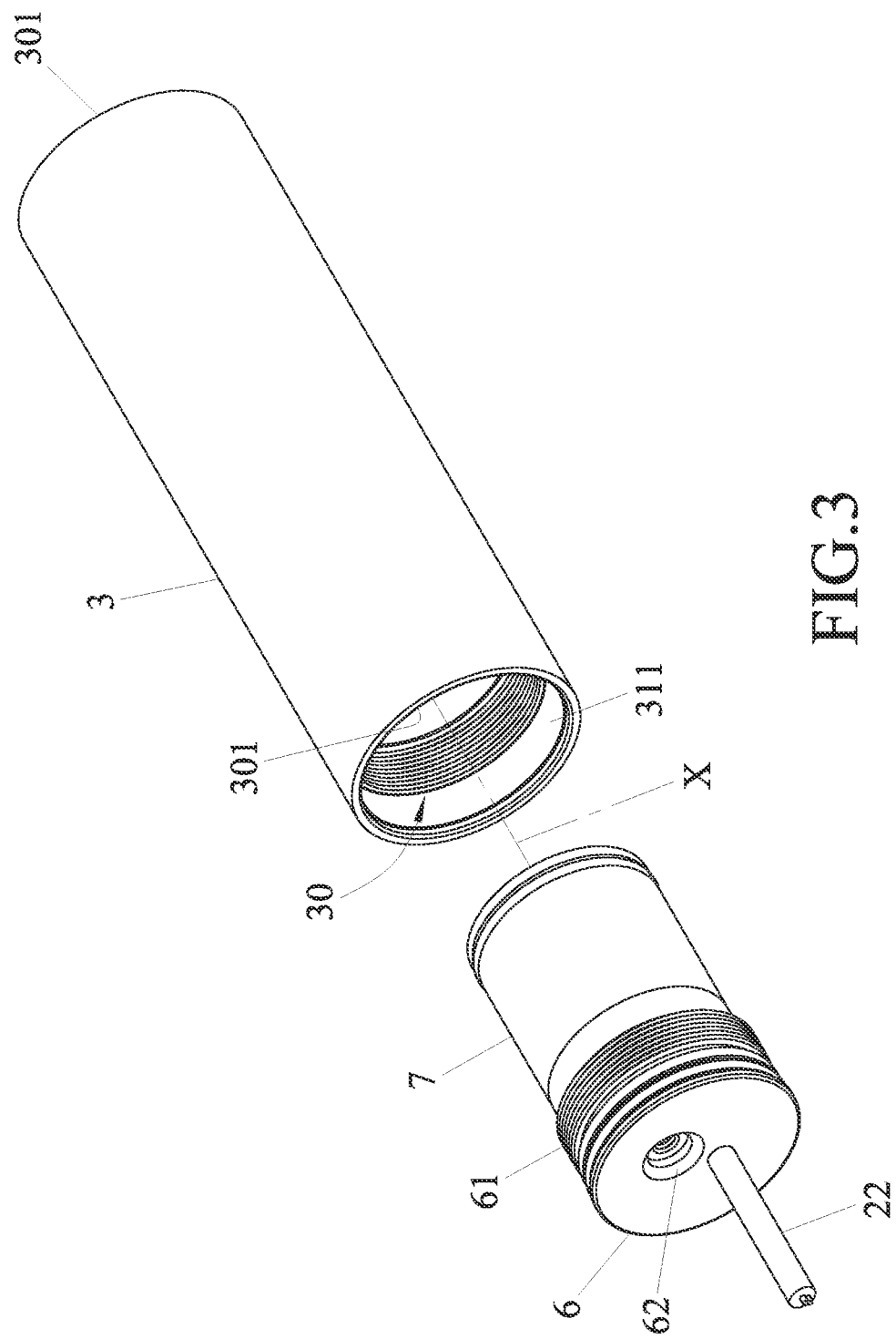
FIG. 3 is a partly exploded perspective view of the cylinder.

Referring to FIGS. 1 to 3, a first embodiment of a shock absorber according to the disclosure includes a shock absorber body 100 and a cylinder 200.

The shock absorber body 100 is adapted for a damping liquid (1) to flow therein and includes an adjusting knob 11 that is adapted to change a level of a damping force. There will be no further details describing the adjusting knob 11 since an adjusting knob that is manually operable to change the level of the damping force is widely-understood by those skilled in the art. In the first embodiment, the shock absorber body 100 exemplarily uses a hydraulic shock absorber in conjunction with a coil spring. However, in certain embodiments, the shock absorber body 100 may be configured as, but not limited to, a hydraulic shock absorber in conjunction with a pneumatic spring.

The cylinder 200 is connected to the shock absorber body 100 and is adapted for the damping liquid (L) to flow therein. In the first embodiment, the shock absorber body 100 and the cylinder 200 are configured to be two components that are connected, but in certain embodiments, the shock absorber body 100 and the cylinder 200 may be integrally formed.

The cylinder 200 includes a cylinder body 3, an oil circuit unit 4, a piston 5, a cover 6 and an electronic control device 7.

The cylinder body 3 has an inner surface 311 that surrounds an axis (X) and that defines a disposing space 30, and has two opposite opening ends 301 through which the disposing space 30 communicates with the external environment.

The oil circuit unit 4 is mounted to one of the opening ends 301 of the cylinder body 3, and has an oil inlet 41 that is connected to the shock absorber body 100.

Figure 4:
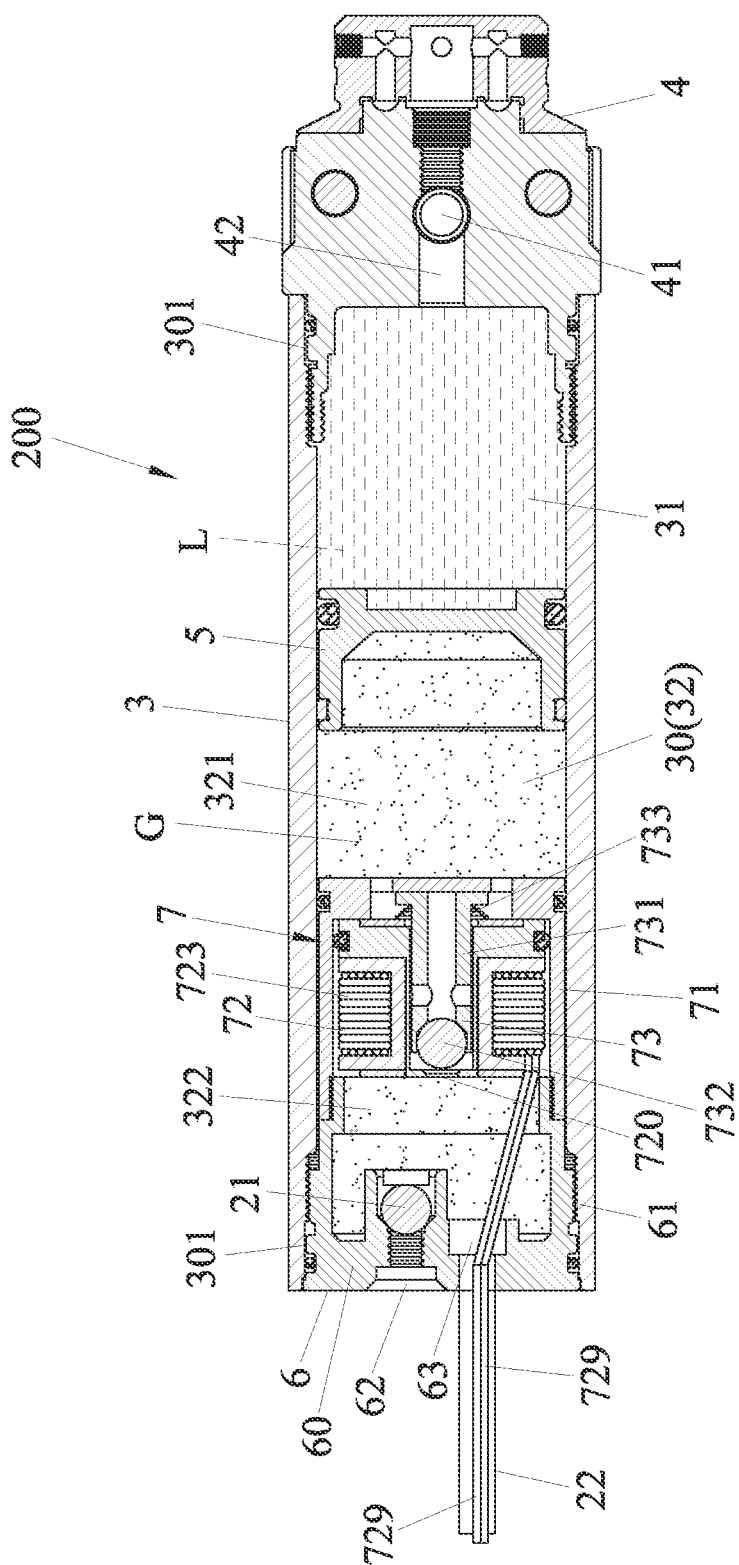
FIG. 4 is a sectional view of the cylinder.

Referring further to FIG. 4, the oil circuit unit 4 further has a flowing channel 42 that communicates with the oil inlet 41 and the disposing space 30, and that is adapted for the damping liquid (L) to flow therethrough. Specifically, the flowing channel 42 fluidly communicates with the disposing space 30, and fluidly communicates with the shock absorber body 100 (see FIG. 1) through the oil inlet 41.

The piston 5 is configured to be a free-floating type piston, is movably disposed in the disposing space 30 of the cylinder body 3, and divides the disposing space 30 into a liquid space 31 and an air space 32. The liquid space 31 communicates with the flowing channel 42 of the oil circuit unit 4 and is adapted for the damping liquid (L) to flow therein. The air space 32 is adapted for a gas (G) to be filled in. The gas (G) may be, but not limited to, nitrogen. The piston 5 includes a plurality of sealing rings that prevent the gas (G) from getting in the liquid space 31 from the air space 32, and that prevent the damping liquid (L) from getting in the air space 32 from the liquid space 31.

The cover 6 is mounted to the other one of the opening ends 301 of the cylinder body 3 such that the air space 32 of the cylinder body 3 is enclosed. The cover 6 has a cover body 60, an outer threaded section 61, a cover vent hole 62 and a cover opening 63 that is spaced apart from the cover vent hole 62. The cover 6 is threadedly mounted to the other one of the opening ends 301 of the cylinder body 3 via the outer threaded section 61. Each of the cover vent hole 62 and the cover opening 63 extends through the cover body 60 so that the air space 32 of the cylinder body 3 communicates with the external environment through the cover vent hole 62 and the cover opening 63. The cover vent hole 62 is adapted to be disposed with a ball-check valve 21 that includes an air-blocking ball removably blocking the cover vent hole 62. When the cover vent hole 62 is adapted to be connected to an air pump (not shown) that provides the gas (G), the air-blocking ball is pushed away from the cover vent hole 62 by the gas (G) so that the gas (G) is filled in the air space 32 of the cylinder body 3. When the air pump ceases to provide the gas (G), or when the air pump is removed, the air-blocking ball blocks the cover vent hole 62 so that the ball-check valve 21 prevents the gas (G) from leaving the air space 32 through the cover vent hole 62. The cover opening 63 is adapted to be mounted with a wire tube 22.

When the shock absorber is under shock impulses (e.g., when a driver drives a vehicle that is equipped with the shock absorber on uneven roads), the piston 5 is adapted to be movable by the damping liquid (L) that flows between the shock absorber body 100 and the liquid space 31 of the cylinder body 3 to compress the gas (G) filled in the air space 32 of the cylinder 200 so that the cylinder 200 absorbs the shock impulses. That is to say, according to the flow of the damping liquid (L), the gas (G) in the air space 32 may be compressed by the piston 5, or be decompressed, so that the shock absorber absorbs shock.

Figure 5:
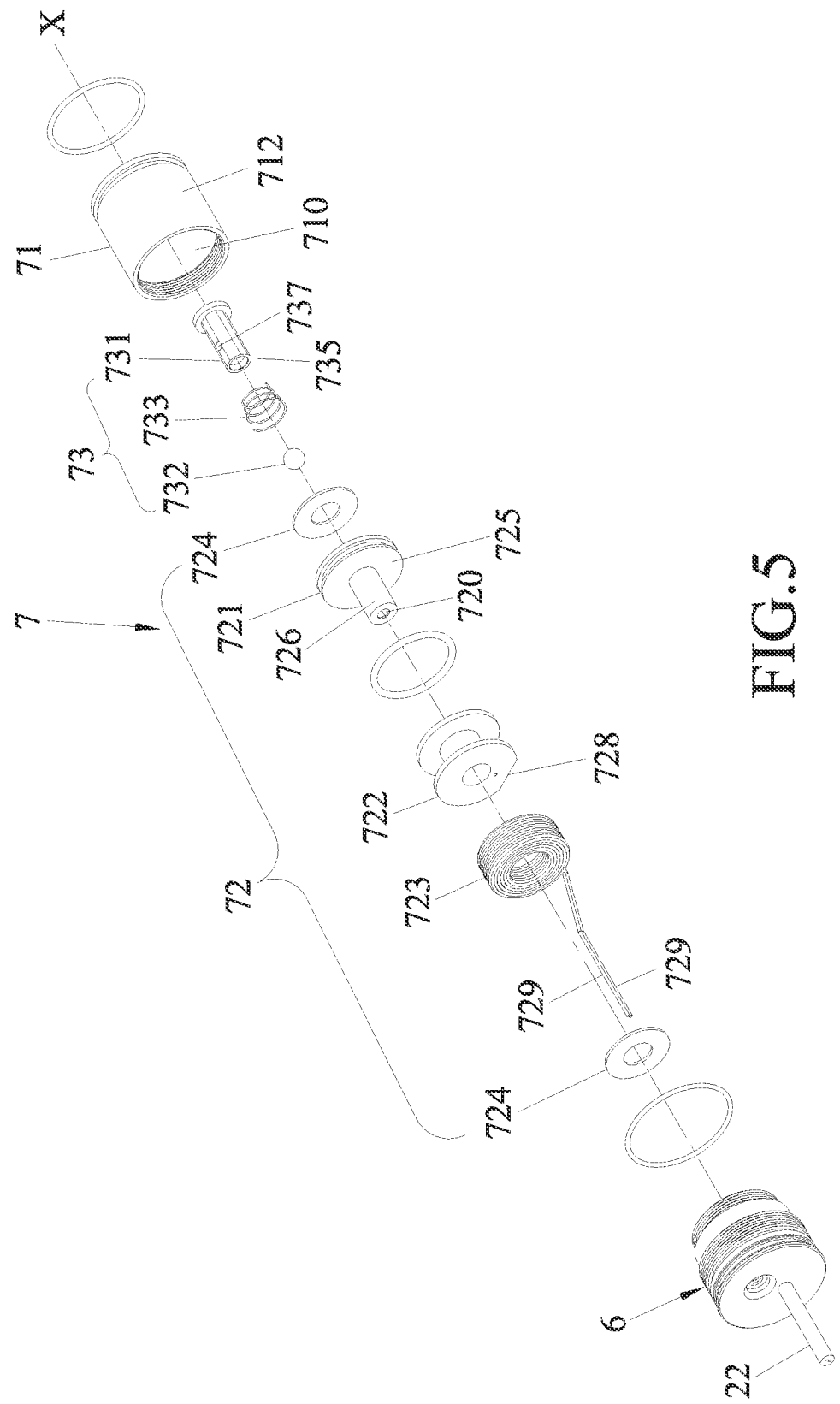
FIG. 5 is an exploded perspective view of a cover and an electronic control device of the cylinder.
Figure 6:
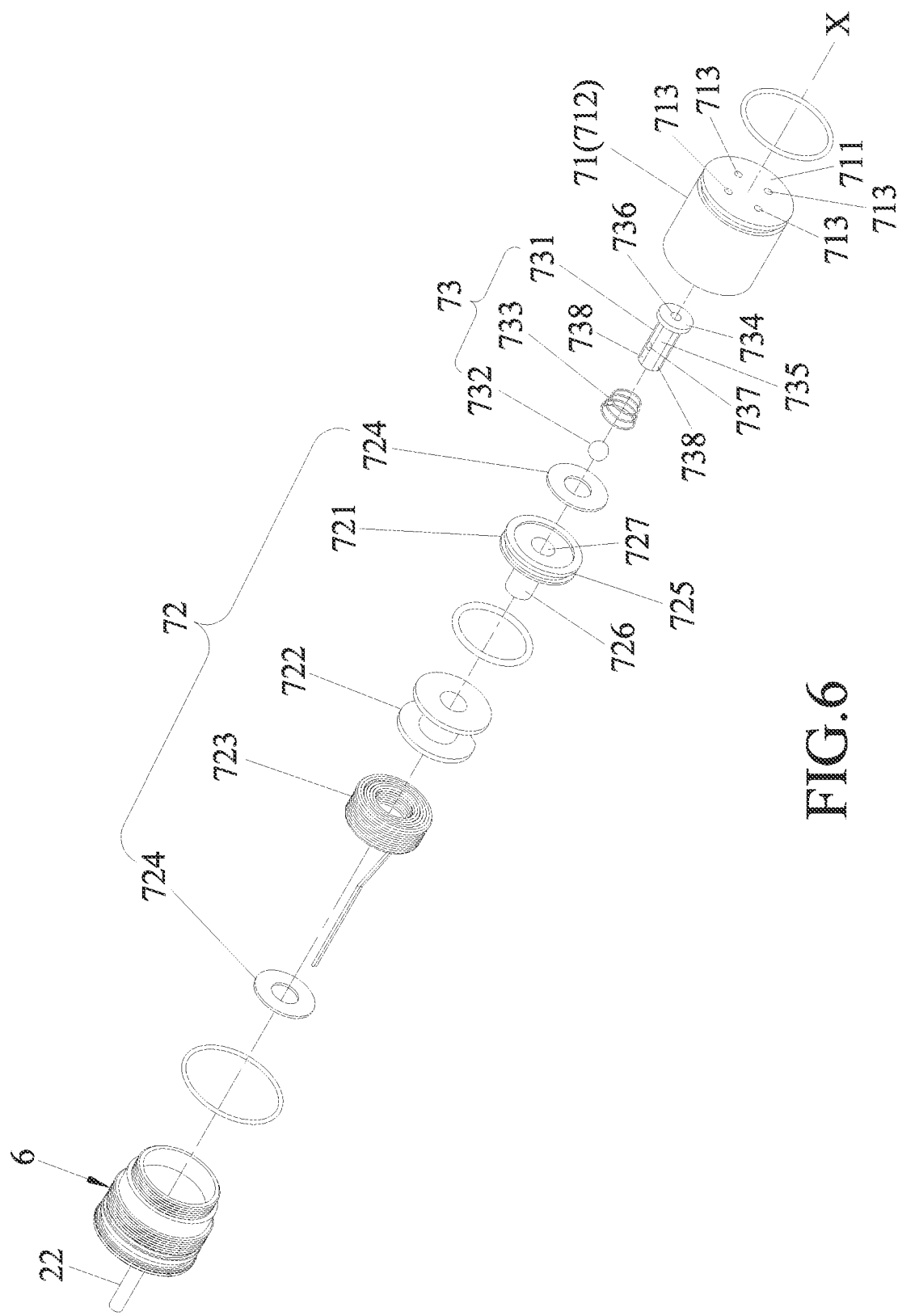
FIG. 6 is another exploded perspective view of the cover and the electronic control device of the cylinder.
Figure 7:
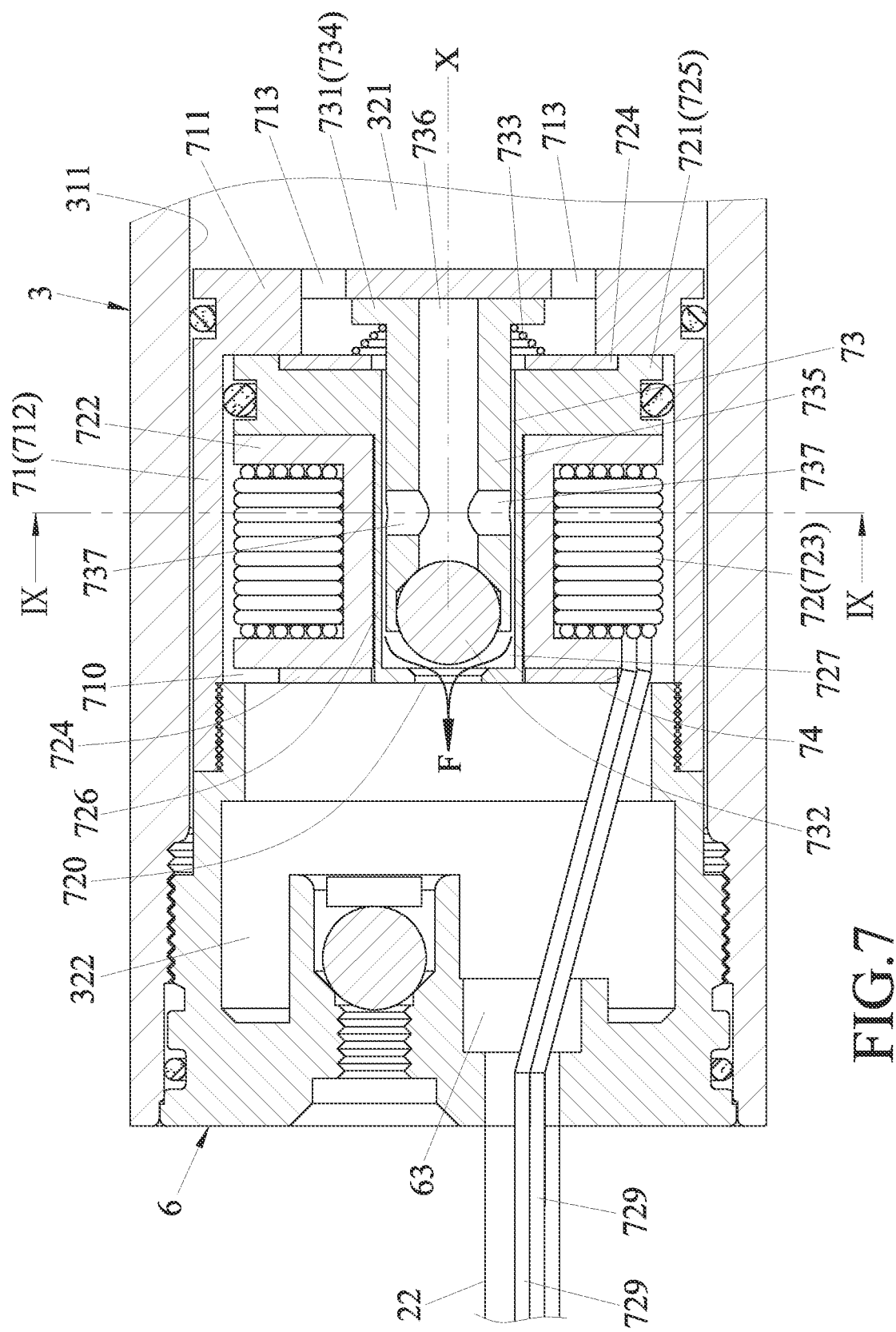
FIG. 7 is fragmentary, enlarged sectional view of the cylinder, illustrating a rod unit of the cylinder in an unblocking state.

Referring further to FIGS. 5 to 7, the electronic control device 7 is disposed in the air space 32 of the cylinder body 3, divides the air space 32 into a first chamber space 321 and a second chamber space 322 (see FIG. 4), and includes a device housing 71, an electromagnetic unit 72 and a rod unit 73.

The device housing 71 is disposed in the air space 32 of the cylinder body 3, and has a base wall 711 and a surrounding wall 712. The base wall 711 is airtightly connected to the inner surface 311 of the cylinder body 3. The surrounding wall 712 extends from a periphery of the base wall 711 toward the cover surrounds the axis (X), is threadedly connected to the cover 6, and defines an accommodating groove 710 that opens toward the cover 6. The base wall 711 has a plurality of base vent holes 713 through which the accommodating groove 710 communicates with the first chamber space 321 of the air space 32 of the cylinder body 3 (i.e., the gas (G) in the first chamber space 321 may enter the accommodating groove 710 through the base vent holes 713, and vice versa). In the first embodiment, the base wall 711 has four base vent holes 713 (see FIG. 6), which, in comparison with only one base vent hole, allows more gas (G) to flow between the first chamber space 321 and the accommodating groove 710 within a specific time interval. However, in certain embodiments, the base wall 711 may have less than four base vent holes, or more than four base vent holes, as long as the gas (G) can flow between the first chamber space 321 and the accommodating groove 710.

The electromagnetic unit 72 of the electronic control device 7 is disposed at the device housing 71, is surrounded by the surrounding wall 712 of the device housing 71, generates a magnetic field when energized, and includes a mounting base 721, a coil seat 722, a col 723 and two metal plates 724. The mounting base 721 is made or a stainless steel material, is airtightly disposed in the accommodating groove 710 of the device housing 71, and has a base part 725, a rod part 726 and an inner surface that defines a mounting hole 727. The base part 725 of the mounting base 721 is airtightly disposed at the surrounding wall 712 of the device housing 71. (i.e., the base part 725 is airtightly disposed in the accommodating groove 710). The rod part 726 of the mounting base 721 extends from the base part 725, through the coil seat 722, and toward the cover 6. The mounting hole 727 extends through the base part 725 and the rod part 726 of the mounting base 721. Specifically, the mounting hole 727 extends along the axis (X), and has two opposite ends respectively proximate to and distal from the cover 6. One of the ends of the mounting hole 727 that is proximate to the cover 6 is formed with a chamber communicating opening 720 through which the first chamber space 321 and the second chamber space 322 of the air space 32 of the cylinder body 3 fluidly communicate with each other.

Figure 8:
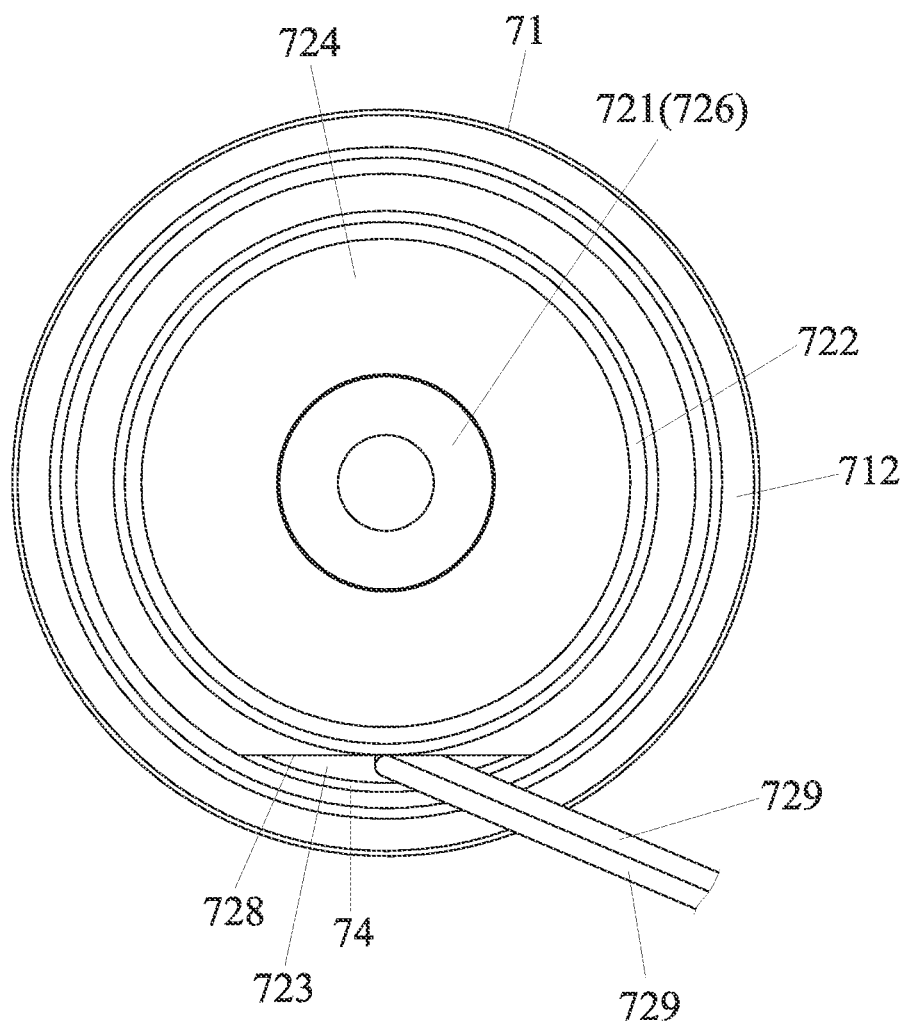
FIG. 8 is a fragmentary plan view illustrating coil ends of a coil of the electronic control device extending through a coil opening of the electronic control device.

Referring further to FIG. 8, the coil seat 722 of the electromagnetic unit 72 of the electronic control device 7 is disposed in the accommodating groove 710, is sleeved on the rod part 726 of the mounting base 721 (see FIG. 7), and has a seat indented part 728. The seat indented part 728 is formed at one end of the coil seat 722 and cooperates with the surrounding wall 712 of the device housing 71 to define a coil opening 74. The coil 723 surrounds the coil seat 722, is capable of being energized by electricity, and has two coil ends 729. Through the coil opening 74 of the electronic control device 7, the coil ends 729 extend away from the accommodating groove 710 of the device housing 71 to extend through the cover 6, and to be adapted to extend into the wire tube 22. The coil ends 729 are adapted to be electrically coupled to a button (not shown) that is at a driver's seat or at a bicycle handlebar, and that is operable by a driver/rider.

One of the metal plates 724 of the electromagnetic unit 72 is mounted to the base part 725 of the mounting base 721. The other one of the metal plates 724 is adjacent to the chamber communicating opening 720 of the electronic control device 7, is sleeved on the rod part 726 of the mounting base 721, and abuts against the coil seat 722. The metal plates 724 are made of an iron material. When the coil 723 is energized by electricity, the electric current generates a magnetic field so that the metal plates 724 become magnetic.

The rod unit 73 of the electronic control device 7 is disposed at the base wall 711 of the device housing 71 and the electromagnetic unit 72, and includes a moving rod 731, a blocking member 732 and an elastic member 733. The moving rod 731 is made of an iron material that will become magnetic when in a magnetic field produced by an electric current. The moving rod 731 extends through the one of the metal plates 724 of the electromagnetic unit 72 that is mounted to the base part 725 of mounting base 721, extends into the mounting hole 727 of the electromagnetic unit 72, is movable relative to the mounting hole 727 of the electromagnetic unit 72, and has two opposite ends, a rod base body 734, a main rod body 735 and an axial hole 736. The rod base body 734 is located at one of the ends of the moving rod 731. The main rod body 735 extends from the rod base body 734 toward the chamber communicating opening 720 of the electromagnetic unit 72, extends into the mounting hole 727 of the mounting base 721, and has an end (i.e., the other one of the ends of the moving rod 731) that is opposite to the rod base body 734, and an outer surface that faces the inner surface of the mounting base 721 of the electromagnetic unit 72. The axial hole 736 extends through the rod base body 734 and the main rod body 735, and extends along the axis (X). The main rod body 735 is formed with two radial holes 737 (see FIG. 7) each of which extends perpendicular to the axis (X) and communicates with the axial hole 736 and the mounting hole 727 of the mounting base 721. The blocking member 732 is mounted to the end of the main rod body 735 (i.e., the other one of the ends of the moving rod 731). The blocking member 732 is made of a rubber material, is configured to be in a shape of a sphere and be resilient. The elastic member 733 is resiliently disposed between the electromagnetic unit 72 and the moving rod 731. Specifically, the elastic member 733 is resiliently disposed between the base part 725 of the mounting base 721 and the rod base body 734 of the moving rod 731, and resiliently abuts against the one of the metal plates 724 of the electromagnetic unit 72 that is mounted to the base part 725 of the mounting base 721. More specifically, the one of the metal plates 724 abuts against one end of the elastic member 733 opposite to the rod base body 734 (i.e., the one of the ends of the moving rod 731). It is noted that, in the first embodiment, the elastic member 733 is configured to be a conical compression spring that has a relatively small that is operable even when a relatively high load is applied, and that has relatively low deflection rate. Therefore, a space between the base part 725 of the mounting base 721 and the rod base body 734 of the moving rod 731 may be minimized. However, in certain embodiments, the elastic member 733 may be, but not limited to, a spring of a different type (e.g., a flat spring).

Figure 9:
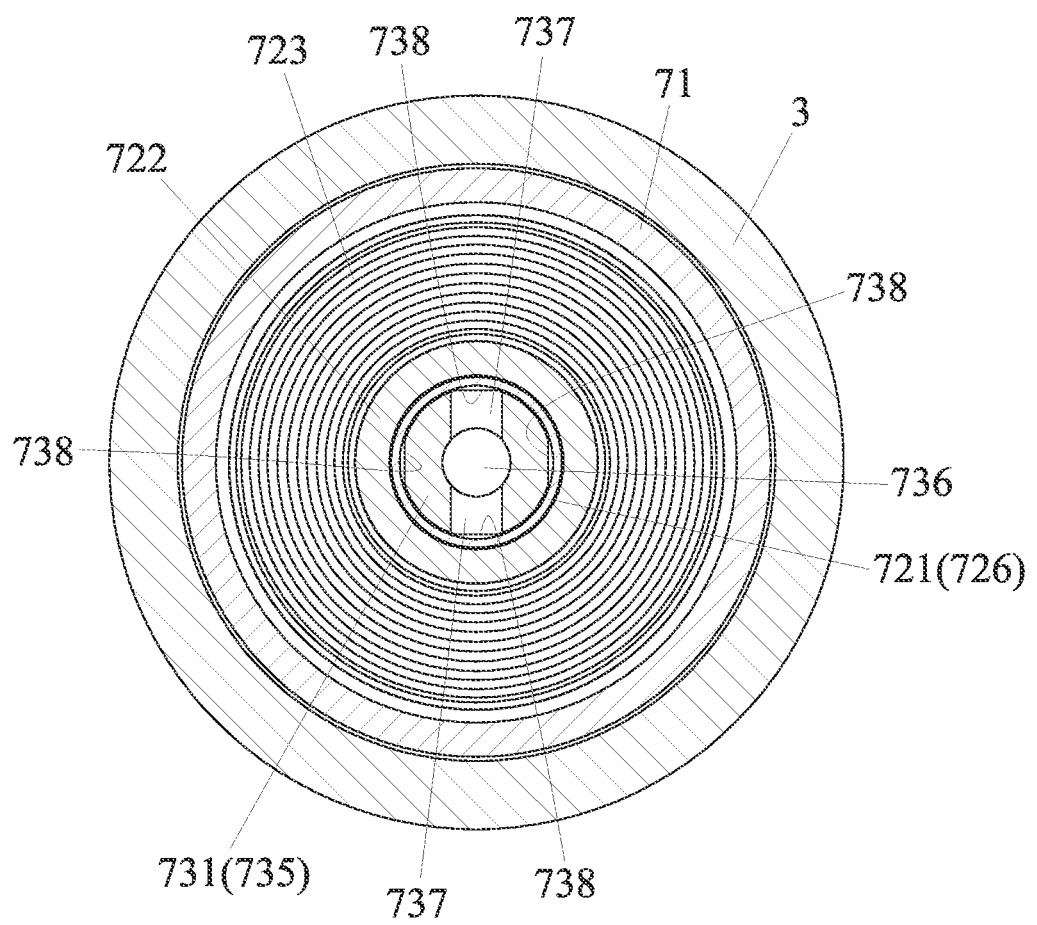
FIG. 9 is a sectional view taken along line IX-IX in FIG. 7.

Referring further to FIG. 9, the outer surface of the main rod body 735 of the rod unit 73 is formed with four surface indented sections 738 each of which is spaced apart from the inner surface of the mounting base 721 of the electromagnetic unit 72. Therefore, each of the surface indented sections 738 cooperates with the inner surface of the mounting base 721 to define a gap therebetween. By virtue of the gaps, the chamber communicating opening 720 of the electronic control device 7 cooperates with the base vent holes 713 of the base wall 711 of the device housing 71 to define an air channel (F) (see FIG. 7) through which the gas (G) flows. Specifically, by virtue of the air channel (F), the gas (G) flows between the first chamber space 321 and the second chamber space 322 (see FIG. 4) of the air space 32.

Figure 10:
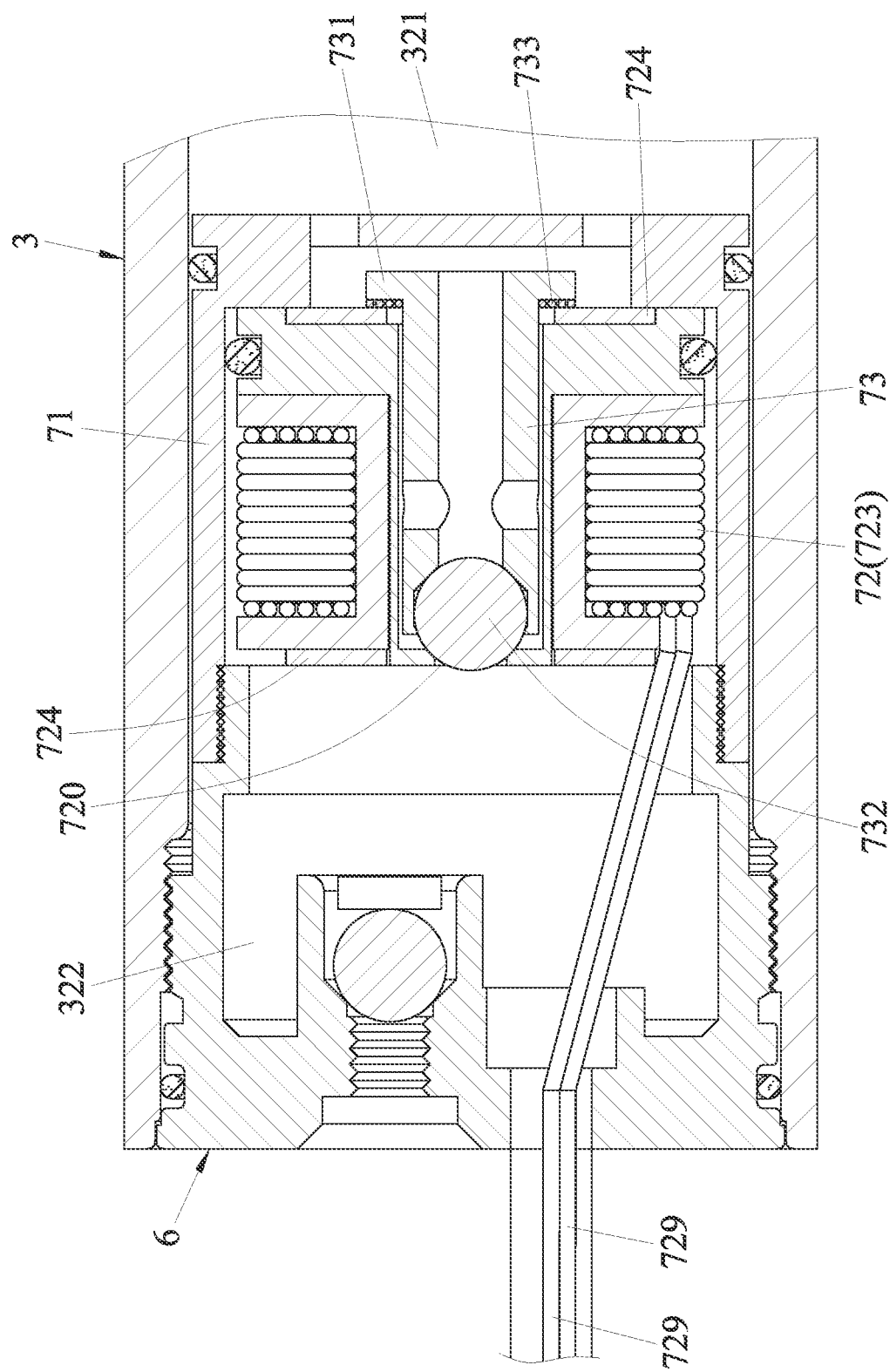
FIG. 10 is a fragmentary, enlarged sectional view of the cylinder, illustrating the rod unit of the cylinder in a blocking state.

The rod unit 73 of the electronic control device 7 is controllable by the electromagnetic unit 72 to convert between a blocking state (see FIG. 10), in which the blocking member 732 of the rod unit 73 blocks the chamber communicating opening 720 of the electromagnetic unit 72 to prevent fluid communication between the first chamber space 321 and the second chamber space 322 of the air space 32, and an unblocking state (see FIG. 7), in which the blocking member 732 unblocks the chamber communicating opening 720 to permit fluid communication between the first chamber space 321 and the second chamber space 322. Because the blocking member 732 is configured to be resilient, the blocking member 732 may provide better airtightness when blocking the chamber communicating opening 720.

Specifically, referring to FIGS. 4 and 7 again, when the coil 723 of the electromagnetic unit 72 is not energized by electricity, the moving rod 731 of the rod unit 73 is not attracted to the metal plates 724 of the electromagnetic unit 72 since there no magnetic field generated. The rod unit 73 is in the unblocking state, in which the blocking member 732 is at an unblocking position and the elastic member 733 is not compressed. The gas (G) is permitted to flow between the first chamber space 321 and the second chamber space 322 of the air space 32 through the chamber communicating opening 720 of the electromagnetic unit 72. Therefore, in the first embodiment, when the piston 5 compresses the gas (G) filled in the air space 32, the gas (G) in both of the first chamber space 321 and the second chamber space 322 is compressed.

Referring to FIG. 10 again, when the coil 723 of the electromagnetic unit 72 is energized, the moving rod 731 of the rod unit 73 and the metal plates 724 of the electromagnetic unit 72 are attracted by a magnetic force generated by the coil 723 such that the rod unit 73 is in the blocking state. Specifically, the moving rod 731 becomes magnetic, is attracted to the metal plates 724, and moves relative to the mounting hole 727 of the mounting base 721 toward the chamber communicating opening 720 so that the blocking member 732 moves to a blocking position at which the blocking member 732 blocks the chamber communicating opening 720. At this time, the rod unit 73 is in the blocking state, in which the elastic member 733 is compressed and stores a potential energy for moving the blocking member 732 to the unblocking position and for converting the rod unit 73 back to the unblocking state. When the rod unit 73 is in the blocking state, the gas (G) is prevented from flowing between the first chamber space 321 and the second chamber space 322 of the air space 32 through the chamber communicating opening 720. Therefore, in the first embodiment, when the piston 5 compresses the gas (G) filled in the air space 32, only the gas (G) in the first chamber space 321 is compressed.

In other words, when the rod unit 73 is in the blocking state, because the piston 5 is not able to compress the gas (G) in the second chamber space 322, the amount of gas (G) compressed by the piston 5 is less than that when the rod unit 73 is in the unblocking state. Consequently, upon the compression, the change of the air pressure in the first chamber space 321 when the rod unit 73 is in the blocking state is faster than that in the air space 32 when the rod unit 73 is in the unblocking state. This means that the shock absorber is relatively soft when the rod unit 73 is in the unblocking state, and that the shock absorber is relatively stiff when the rod unit 73 is in the blocking state.

It is noted that, in the first embodiment, when the rod unit 73 is in the unblocking state and when the piston 5 moves toward the oil circuit unit 4 to return to its earlier position (i.e., when the gas (G) in the air space 32 decompressed), the gas (G) in the second chamber space 322 flows into the axial hole 736 of the moving rod 731 through the chamber communicating opening 720 and the radial holes 737 of the main rod body 735, and then flows into the first chamber space 321 through a gap between the rod base body 734 of the moving rod 731 and the base wall 711 of the device housing 71 and through the base vent holes 713 of the base wall 711. Therefore, the difference between the air pressures in the first chamber space 321 and the second chamber space 322 is reduced so that the piston 5 may swiftly return to its earlier position.

By virtue of the rod unit 73 being controllable by the electromagnetic unit 72 to convert between the blocking state and the unblocking state, the amount of the gas (G) that is compressed by the piston 5 and the volume of the air space 32 that is shrunk by the piston 5 are adjustable. In addition, the structure of the electromagnetic unit 72 and the rod unit 73 is relatively simple and will not easily malfunction.

Figure 11:
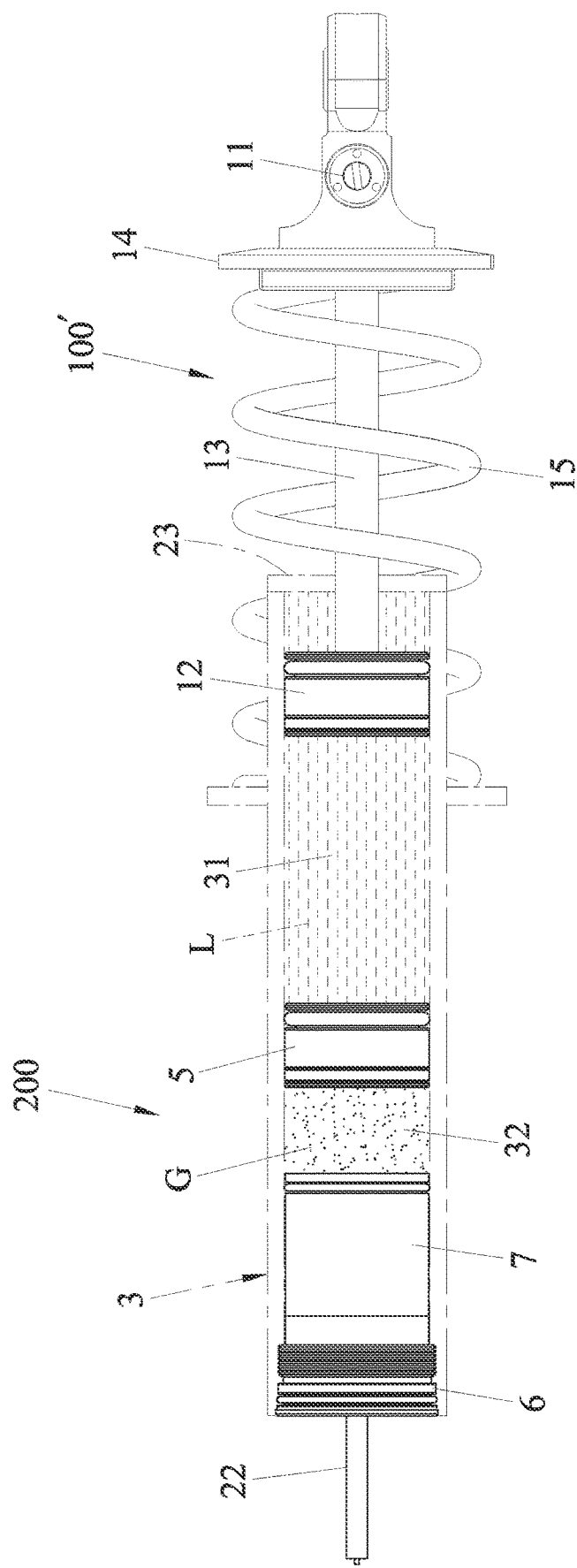
FIG. 11 is a side view illustrating a second embodiment of the shock absorber according to the disclosure.
Figure 12:
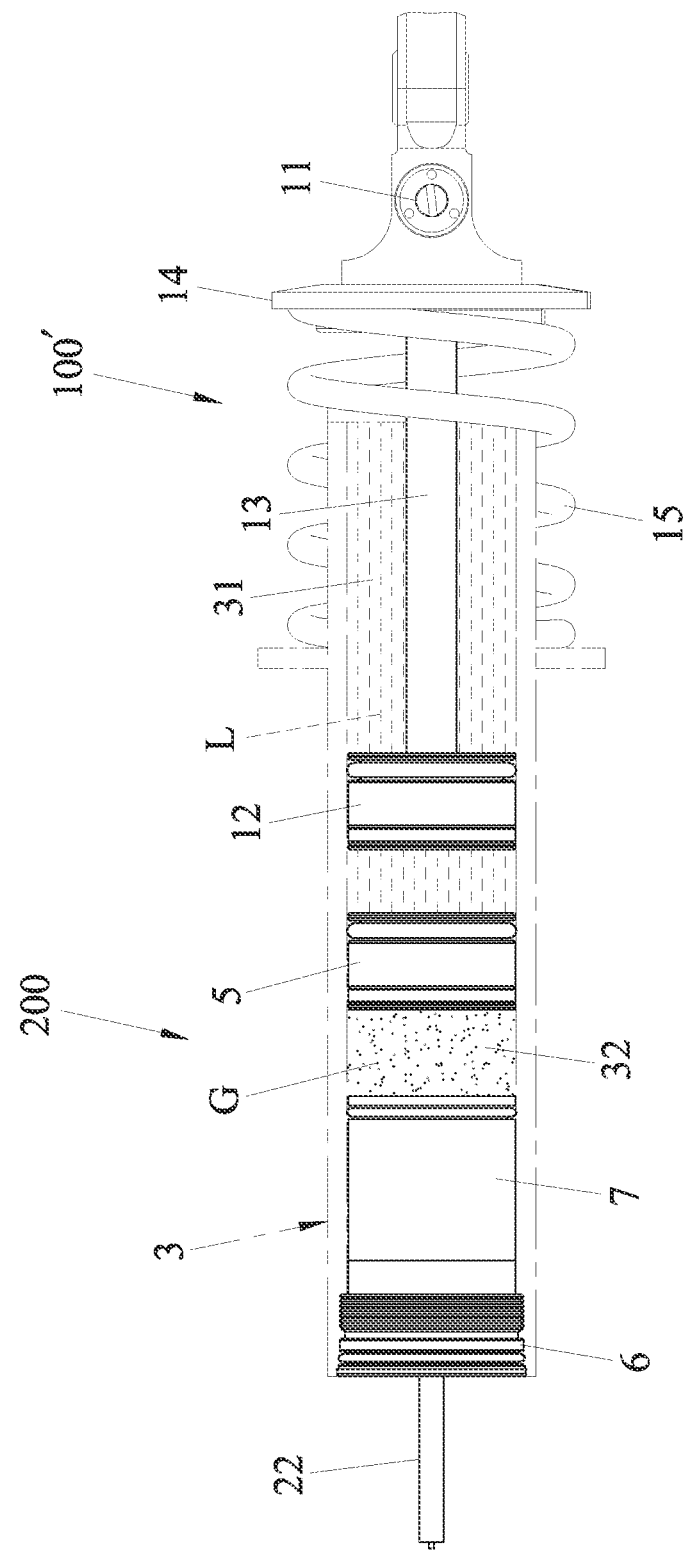
FIG. 12 is another side view illustrating a damping rod member of the second embodiment moving toward a piston of the second embodiment to compress a gas.

Referring further to FIGS. 11 and 12, a second embodiment of the shock absorber according to the disclosure is similar to the first embodiment. In the second embodiment, the shock absorber body 100' and the cylinder 200 are integrally formed, and the oil circuit unit 4 is omitted. The cylinder 200 further includes a space covering member 23 that is mounted to one end of the cylinder body 3 opposite to the cover 6 so that the liquid space 31 of the cylinder body 3 is enclosed.

The shock absorber body 100' includes a damping piston member 12, a damping rod member 13, a conical cover member 14 and an elastic damping member 15. The damping piston member 12 is movably disposed in the liquid space 31 of the cylinder body 3 and is adapted for the damping liquid (L) to flow therethrough. The damping rod member 13 extends through the space covering member 23, and has two opposite ends respectively and fixedly mounted to the damping piston member 12 and the conical cover member 14 so that the damping piston member 12 is comovable with the damping rod member 13. The conical cover member 14 is spaced apart from the cylinder body 3 and is disposed with the adjusting knob 11. The elastic damping member 15 is sleeved on the cylinder body 3 and abuts against the conical cover member 14.

In the second embodiment, when the damping rod member 13 urges the damping piston member 12 to move toward the air space 32 of the cylinder body 3 (see FIG. 12), the damping liquid (L) is pushed by the damping piston member 12 and pushes the piston 5 toward the electronic control device 7. Therefore, the gas (G) in the air space 32 is compressed. At the same time, the elastic damping member 15 compressed and stores a potential energy for moving the damping rod member 13 away from the air space 32. When the potential energy stored by the elastic damping member 15 is released, the damping rod member 13 and the damping piston member 12 move away from the air space 32 so that the as (G) in the air space 32 is decompressed. Consequently, via the movement of the damping rod member 13 and the damping piston member 12, the shock absorber achieves the effect of damping. Furthermore, as with the first embodiment, stiffness of the second embodiment is adjustable during driving. The structure of the second embodiment is relatively simple as well, and may not easily malfunction.

In summary, by virtue of the rod unit 73 being controllable by the coil 723 of the electromagnetic unit 72 to convert between the blocking state and the unblocking state, during driving/riding a vehicle that is equipped with the shock absorber, a driver/rider can adjust the stiffness of the shock absorber through operating a button that is electrically coupled to the coil 723 and that is at a driver's seat or a bicycle/motorcycle handlebar. That is to say, the driver/rider can adjust the shock absorber to be stiffer (i.e., the coil 723 is energized) or softer (i.e., the coil 723 is not energized) to suit the needs of the driver/rider during the driving/riding of the vehicle. Compared with a conventional magnetorheological shock absorber, the shock absorber includes the electronic control device 7 whose structure is relatively simple and may not easily malfunction. Therefore, the service life of the shock absorber may be prolonged, and maintenance expenses of the shock absorber may be reduced. The purpose of the disclosure is certainly fulfilled.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A cylinder adapted for a shock absorber comprising:
a cylinder body having an inner surface that defines a disposing space;
a piston movably disposed in said disposing space, and dividing said disposing space into a liquid space that is adapted for a damping liquid to flow therein, and an air space that is adapted for a gas to be filled in;
a cover mounted to said cylinder body such that said air space of said cylinder body is enclosed; and
an electronic control device disposed in said air space of said cylinder body, dividing said air space into a first chamber space and a second chamber space, and having
a chamber communicating opening through which said first chamber space and said second chamber space fluidly communicate with each other,
an electromagnetic unit that generates a magnetic field when energized, and
a rod unit that includes a blocking member and that is controllable by said electromagnetic unit to convert between a blocking state, in which said blocking member blocks said chamber communicating opening to prevent fluid communication between said first chamber space and said second chamber space, and an unblocking state, in which said blocking member unblocks said chamber communicating opening to permit fluid communication between said first chamber space and said second chamber space;
wherein said rod unit of said electronic control device further includes a moving rod having two opposite ends, and an elastic member;
wherein said blocking member of said rod unit is mounted to one of said ends of said moving rod;
wherein said elastic member is resiliently disposed between said electromagnetic unit and said moving rod; and
wherein when said rod unit is in the blocking state, said blocking member is at a blocking position and said elastic member is compressed and stores a potential energy for moving said blocking member to an unblocking position and for converting said rod unit to the unblocking state.

2. The cylinder as claimed in claim 1, wherein:
said electronic control device includes a device housing disposed in said air space of said cylinder body, airtightly connected to said inner surface of said cylinder body, and having an accommodating groove that opens toward said cover;
said cover is connected to said device housing;
said electromagnetic unit and said rod unit of said electronic control device are disposed at said device housing;
said electromagnetic unit includes a coil seat disposed in said accommodating groove, and a coil surrounding said coil seat, capable of being energized by electricity, and having two coil ends; and
said coil seat has a seat indented part formed at one end of said coil seat and cooperating with said device housing to define a coil opening through which said coil ends extend away from said accommodating groove to extend through said cover.

3. The cylinder as claimed in claim 1, wherein:
said cylinder body further has two opposite opening ends through which said disposing space communicates with the external environment;
said cylinder further includes an oil circuit unit mounted to one of said opening ends of said cylinder body, and having a flowing channel that communicates with said liquid space of said disposing space and that is adapted for the damping liquid to flow therethrough; and
said cover is mounted to the other one of said opening ends of said cylinder body.

4. A shock absorber comprising:
a shock absorber body adapted for a damping liquid to flow therein and including an adjusting knob that is adapted to change a level of a damping force; and
the cylinder of claim 1 connected to said shock absorber body and adapted for the damping liquid to flow therein, said piston of said cylinder being adapted to be movable by the damping liquid to compress the gas filled in said air space of said cylinder so that said cylinder absorbs shock.

5. A cylinder adapted for a shock absorber comprising:
a cylinder body having an inner surface that defines a disposing space;
a piston movably disposed in said disposing space, and dividing said disposing space into a liquid space that is adapted for a damping liquid to flow therein, and an air space that is adapted for a gas to be filled in;
a cover mounted to said cylinder body such that said air space of said cylinder body is enclosed; and
an electronic control device disposed in said air space of said cylinder body, dividing said air space into a first chamber space and a second chamber space, and having
a chamber communicating opening through which said first chamber space and said second chamber space fluidly communicate with each other,
an electromagnetic unit that generates a magnetic field when energized, and
a rod unit that includes a blocking member and that is controllable by said electromagnetic unit to convert between a blocking state, in which said blocking member blocks said chamber communicating opening to prevent fluid communication between said first chamber space and said second chamber space, and an unblocking state, in which said blocking member unblocks said chamber communicating opening to permit fluid communication between said first chamber space and said second chamber space;
wherein said electronic control device includes a device housing disposed in said air space of said cylinder body, airtightly connected to said inner surface of said cylinder body, and having an accommodating groove that opens toward said cover;
wherein said cover is connected to said device housing;
wherein said electromagnetic unit and said rod unit of said electronic control device are disposed at said device housing;
wherein said electromagnetic unit includes a coil seat disposed in said accommodating groove, and a coil surrounding said coil seat, capable of being energized by electricity, and having two coil ends; wherein said coil seat has a seat indented part formed at one end of said coil seat and cooperating with said device housing to define a coil opening through which said coil ends extend away from said accommodating groove to extend through said cover;
wherein said electromagnetic unit of said electronic control device further includes a mounting base having a base part that is airtightly disposed in said accommodating groove of said device housing,
a rod part that extends from said base part, through said coil seat, and toward said cover, and
a mounting hole that extends through said base part and said rod part;
wherein said rod unit extends into said mounting hole and is movable relative to said mounting hole; and
wherein said chamber communicating opening of said electromagnetic unit is formed at one end of said mounting hole.

6. The cylinder as claimed in claim 5, wherein:
said rod unit of said electronic control device further includes
a moving rod extending into said mounting hole of said electromagnetic unit, movable relative to said mounting hole, and having two opposite ends, and
an elastic member;
said blocking member of said rod unit is mounted to one of said ends of said moving rod;
said elastic member is resiliently disposed between said base part of said electromagnetic unit and said moving rod; and
when said rod unit is in the blocking state, said blocking member is at a blocking position and said elastic member is compressed and stores a potential energy for moving said blocking member to an unblocking position and for converting said rod unit to the unblocking state.

7. The cylinder as claimed in claim 6, wherein:
said electromagnetic unit of said electronic control device further includes two metal plates;
one of said metal plates is mounted to said base part of said mounting base and abuts against one end of said elastic member of said rod unit opposite to the other one of said ends of said moving rod, said moving rod extending through the one of said metal plates;
the other one of said metal plates is adjacent to said chamber communicating opening of said electronic control device, is sleeved on said rod part of said mounting base, and abuts against said coil seat; and
when said coil of said electromagnetic unit is energized, said moving rod and said metal plates are attracted by a magnetic force generated by said coil such that said rod unit is in the blocking state.

8. The cylinder as claimed in claim 7, wherein each of said metal plates and said moving rod of said electronic control device is made of an iron material.

9. A cylinder adapted for a shock absorber comprising:
a cylinder body having an inner surface that defines a disposing space;
a piston movably disposed in said disposing space, and dividing said disposing space into a liquid space that is adapted for a damping liquid to flow therein, and an air space that is adapted for a gas to be filled in;
a cover mounted to said cylinder body such that said air space of said cylinder body is enclosed; and
an electronic control device disposed in said air space of said cylinder body, dividing said air space into a first chamber space and a second chamber space, and having
a chamber communicating opening through which said first chamber space and said second chamber space fluidly communicate with each other,
an electromagnetic unit that generates a magnetic field when energized, and
a rod unit that includes a blocking member and that is controllable by said electromagnetic unit to convert between a blocking state, in which said blocking member blocks said chamber communicating opening to prevent fluid communication between said first chamber space and said second chamber space, and an unblocking state, in which said blocking member unblocks said chamber communicating opening to permit fluid communication between said first chamber space and said second chamber space;
wherein said electronic control device includes a device housing disposed in said air space of said cylinder body, airtightly connected to said inner surface of said cylinder body, and having
a base wall and
a surrounding wall that extends from a periphery of said base wall toward said cover, that is connected to said cover, and that defines an accommodating groove;
wherein said electromagnetic unit is surrounded by said surrounding wall of said device housing;
wherein said rod unit of said electronic control device is disposed at said base wall of said device housing;
wherein said base wall of said device housing has at least one base vent hole through which said accommodating groove communicates with said first chamber space of said air space; and
wherein said chamber communicating opening of said electronic control device cooperates with said at least one base vent hole of said base wall to define an air channel through which the gas flows.

10. The cylinder as claimed in claim 9, wherein:
said electromagnetic unit of said electronic control device includes
a mounting base airtightly disposed in said accommodating groove of said device housing, and having a mounting hole that extends therethrough and that has two opposite ends respectively proximate to and distal from said cover,
a coil seat sleeved on said mounting base, and
a coil surrounding said coil seat and capable of being energized by electricity; and
said chamber communicating opening of said electromagnetic unit is formed at one of said ends of said mounting hole.

11. The cylinder as claimed in claim 10, wherein:
said mounting base of said electromagnetic unit of said electronic control device further has an inner surface defining said mounting hole;
said rod unit of said electronic control device further includes
a moving rod extending into said electromagnetic unit of said electronic control device, movable relative to said electromagnetic unit, and having
a rod base body, and
a main rod body that extends from said rod base body toward said chamber communicating opening of said electromagnetic unit, that extends into said mounting hole of said mounting base, and that has an end opposite to said rod base body and an outer surface facing said inner surface of said mounting base, and
an elastic member resiliently disposed between said electromagnetic unit and said moving rod;
said blocking member of said rod unit is mounted to said end of said main rod body of said moving rod; and said outer surface of said main rod body is formed with a plurality of surface indented sections each of which is spaced apart from said inner surface of said mounting base.

* * * * *